April 26, 1938.   C. W. SINCLAIR   2,115,183
WHEEL
Original Filed Dec. 14, 1931
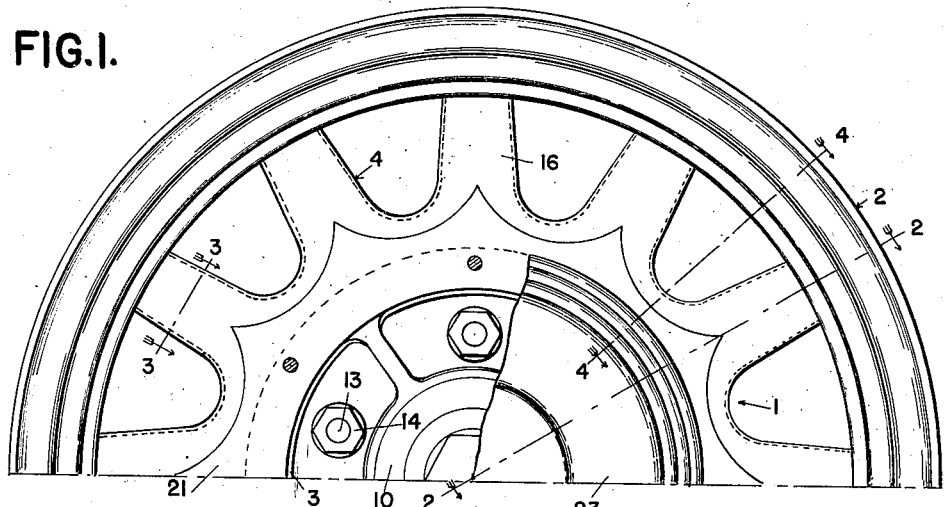
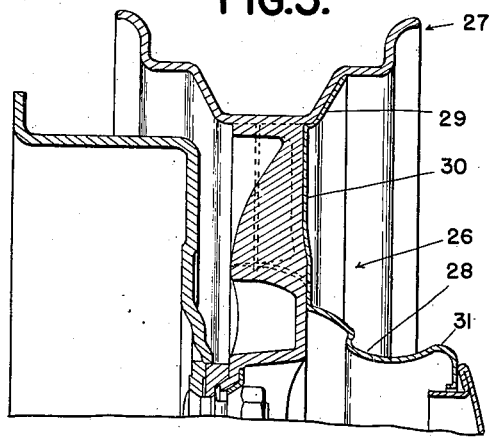
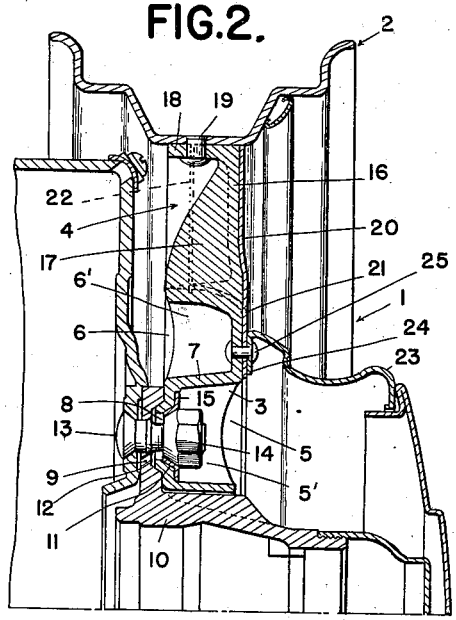
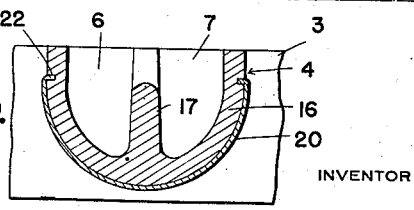
INVENTOR
CHARLES W. SINCLAIR
BY
ATTORNEY Patented Apr. 26, 1938

2,115,183

UNITED STATES PATENT OFFICE 2,115,183

WHEEL

Charles W. Sinclair, Detroit, Mich., assignor to The Kelsey-Hayes Wheel Company, Detroit, Mich., a corporation of Delaware Original application December 14, 1931, Serial No. 580,979. Divided and this application June 24, 1935, Serial No. 28,167

5 Claims. (Cl. 301—37)

The invention relates to wheels and refers more particularly to wheels for motor vehicles.

One of the objects of the invention is to provide a relatively light weight wheel which is so constructed that it will stand up under the various stresses to which it is subjected in use. Another object is to so construct the wheel that it may have an ornamental cover forming a permanent part thereof. Further objects are to so construct the wheel that it is readily cast; to make the wheel demountable from the inner hub; to construct the wheel body and inner hub with interfitting driving projections and recesses; and to provide the wheel body and more particularly the part thereof having the driving portions with reinforcing means.

These and other objects of the invention will become apparent from the following description, taken in connection with the accompanying drawing, in which Figure 1 is a front elevation of a portion of a wheel showing an embodiment of my invention;

Figures 2, 3 and 4 are cross sections respectively on the lines 2—2, 3—3 and 4—4 of Figure 1;

Figure 5 is a view similar to Figure 2, showing another embodiment of my invention.

The wheel shown in Figures 1, 2, 3 and 4 has a wheel body 1 and a rim member 2. The wheel body is of the demountable type and comprises an outer hub member 3 and a spoked portion 4 integral with the outer hub member and extending radially and outwardly therefrom to the rim member.

The outer hub member has a radially inner forwardly opening channel portion 5 and a radially outer rearwardly opening channel portion 6, there being an annular wall 7 between and forming part of these channel portions. 5' and 6' are reinforcing ribs extending radially and across and integral with the radially inner and radially outer channel portions respectively. The web of the radially inner channel portion 5 is provided with the annular series of holes 8 for the passage of the members used in securing the wheel body to the fixed flange 9 of the inner hub 10. This web is also preferably provided with tapered driving projections 11 in which the holes 8 are formed and the fixed flange 9 is provided with correspondingly tapered recesses 12 for receiving projections 11, the construction being such that these interfitting projections and recesses accomplish the driving of the wheel body from the inner hub. The wheel body is secured to the inner hub by suitable means which, as shown in the present instance, comprises bolts 13 and nuts 14. For reinforcing the outer hub member of the wheel body and also providing a good wearing face for engagement with the nuts, I have provided a plate 15 which is located at the forward side of the web of the radially inner channel 5 and has tapered projections surrounding the forward portions of the holes 8 and engageable by the noses of the nuts, the noses having a corresponding taper.

The spoked portion 4 comprises radially extending spokes 16 which radiate from the outer wall of the outer hub member 3 and are integral with this outer hub member. Each of these spokes has an approximately semi-circular cross section and each opens rearwardly of the wheel. Each of the spokes is also preferably provided with an integral intermediate longitudinally extending reinforcing rib 17 and with an integral transverse cap 18 at its outer end. The rim member 2, which, as shown, is a tire carrying rim of the drop-center type, is mounted upon the caps 18 and fixedly secured thereto by suitable means, such as rivets 19.

The construction of the wheel body is such that it may be readily cast and also that it may be cast from a relatively light metal, such as magnesium alloy. The plate 15 is suitably located in the mold prior to the casting and, as a consequence, this plate is imbedded in the casting and permanently secured thereto and efficiently functions in reinforcing the outer hub member.

In order to present a highly pleasing appearance, the wheel body and more particularly the web member is provided with a cover which may be formed of suitable material, such as stainless steel. This cover is preferably formed from relatively thin stock and has portions 20 which embrace the spokes 16 and is provided with an integral annular portion 21 which is located at the front side of the web of the radially outer channel portion 6. The embracing portions 20 are formed with inturned flanges 22 at their edges which extend into and are imbedded in the metal forming the spokes 16, this cover being preferably located in the mold prior to the casting operation so that it will be effectively anchored in the casting.

23 is a generally cylindrical hub shell having at its rear edge an inturned annular flange 24 which is adapted to be secured against the annular portion 21 of the cover and to the wheel body by suitable means, such as rivets 25, which extend through the web of the outer channel of the outer hub member.

In the modification shown in Figure 5, the construction of the wheel body 26 is the same as that of the wheel body 1. However, in this modification the rim member 27, which is also of the drop-center type, is formed integral with the wheel body and the means for presenting the pleasing and ornamental appearance is a one-piece combined cover and hub shell 28 having an outer annular portion 29 at the front side of the rim member, integral spoke embracing portions 30 at the front side of the spokes of the wheel body and anchored thereto in the same manner as illustrated particularly in Figure 3, and the integral hub shell 31.

The present application is a division of my copending application Serial No. 580,979, filed December 14th, 1931, which issued into Patent No. 2,008,933, dated July 23rd, 1935.

What I claim as my invention is:

1. In a wheel, a wheel body, comprising a hub member, a web member integral with said hub member, and cover means for said web member imbedded therein and permanently secured thereto.

2. In a wheel, a wheel body, comprising a hub member, integral spokes, and cover means permanently secured to said spokes and having portions imbedded therein.

3. In a wheel, a wheel body, comprising a hub member, integral spokes, and a cover for said spokes having portions embracing said spokes and terminating in flanges imbedded therein.

4. In a wheel, the combination of a hub member, a web member integral with said hub member, a rim member integral with said web member, and a one-piece cover means for said web and rim members having portions imbedded in and permanently secured to one of said members.

5. A vehicle wheel of the bolted-on type including, in combination, a single stamping sheet metal spider comprising a deep conical nave portion and spoke portions of channel section having roots pressed from said nave portion, and a reinforcing and stiffening spider having an annular portion interconnecting the outer periphery of said nave portion between the spokes, and radial arms extending into the spoke portions and connecting the side walls of said spoke portions and terminating in their outer extremities in substantially axially extending flanges arranged to seat and be secured to a rim.

CHARLES W. SINCLAIR.